Oct. 20, 1931.  L. O. LUCKA ET AL  1,827,851
VEHICLE DIRECTION SIGNAL
Filed Jan. 30, 1931  3 Sheets-Sheet 1
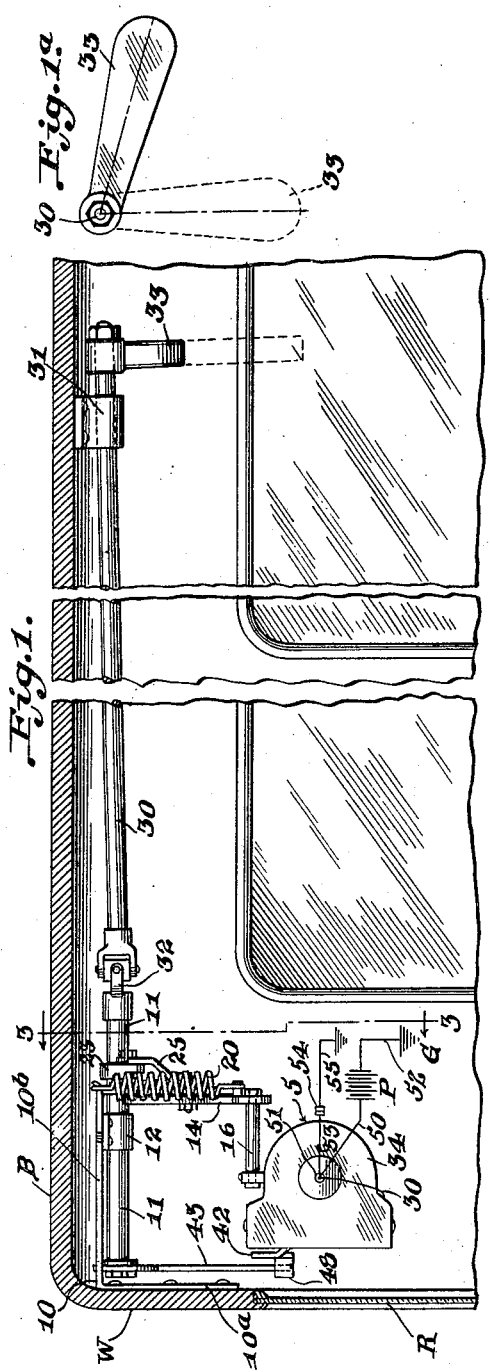
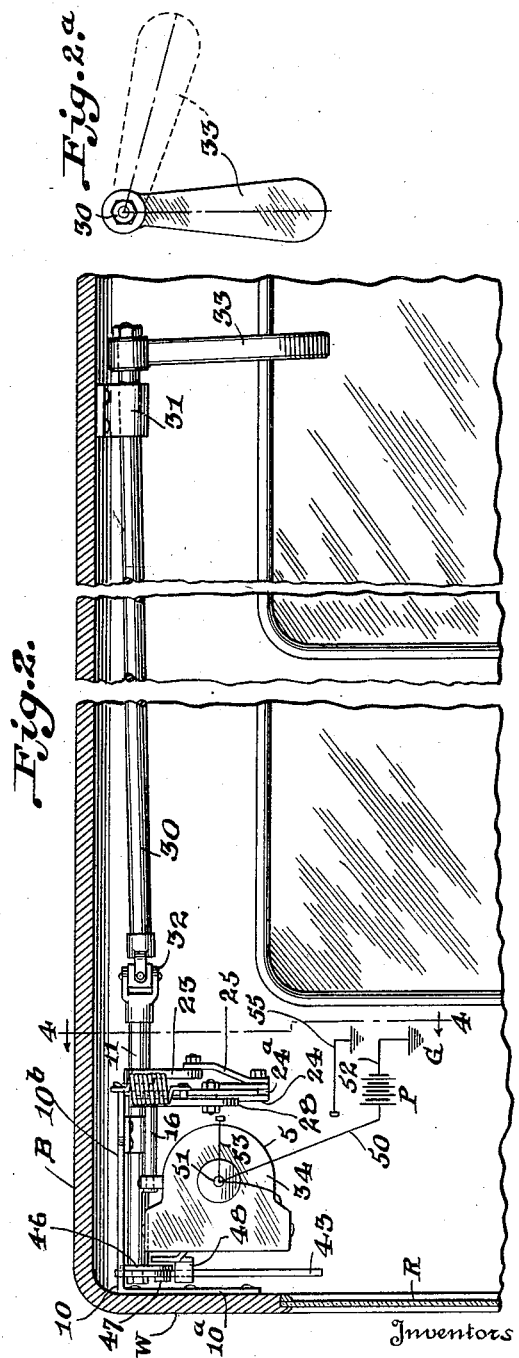
Inventors
L. O. Lucka
J. W. Easley
By Hubert E. Peck  Attorney Oct. 20, 1931.    L. O. LUCKA ET AL    1,827,851
VEHICLE DIRECTION SIGNAL
Filed Jan. 30, 1931    3 Sheets-Sheet 2
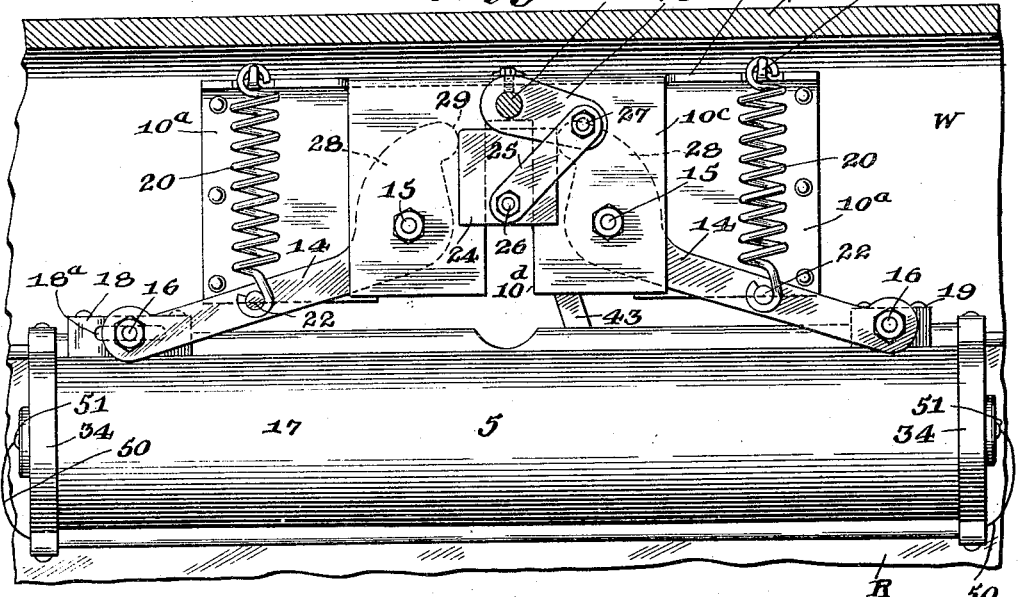
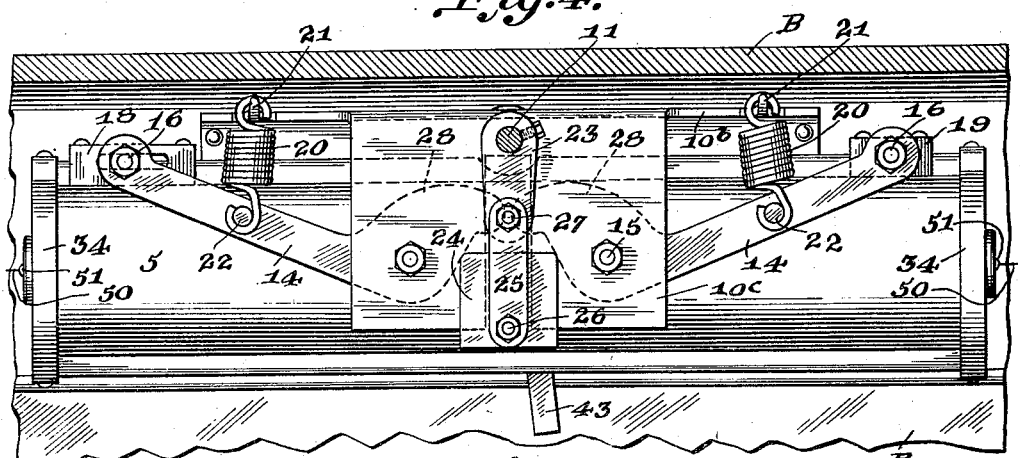
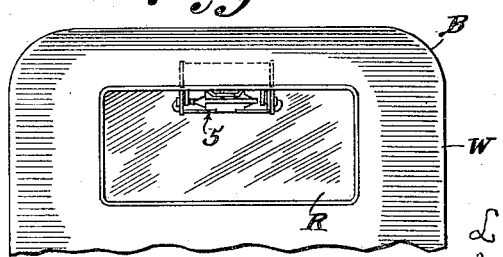
Inventors
L. O. Lucka
J. W. Easley
By Hubert E. Peck Attorney Oct. 20, 1931.   L. O. LUCKA ET AL   1,827,851
VEHICLE DIRECTION SIGNAL
Filed Jan. 30, 1931    3 Sheets-Sheet 3
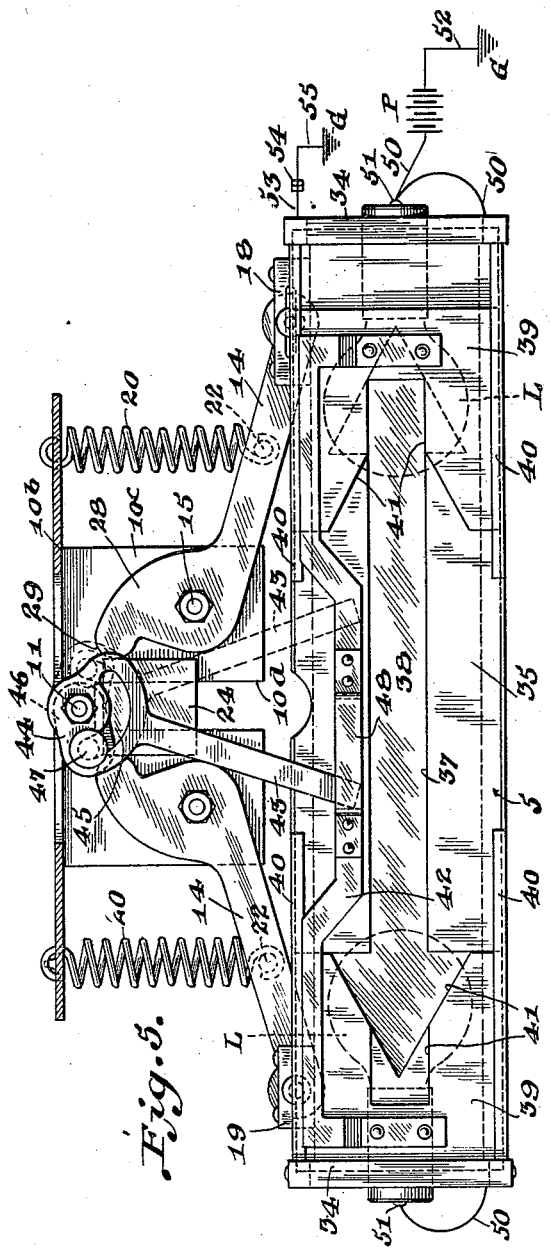
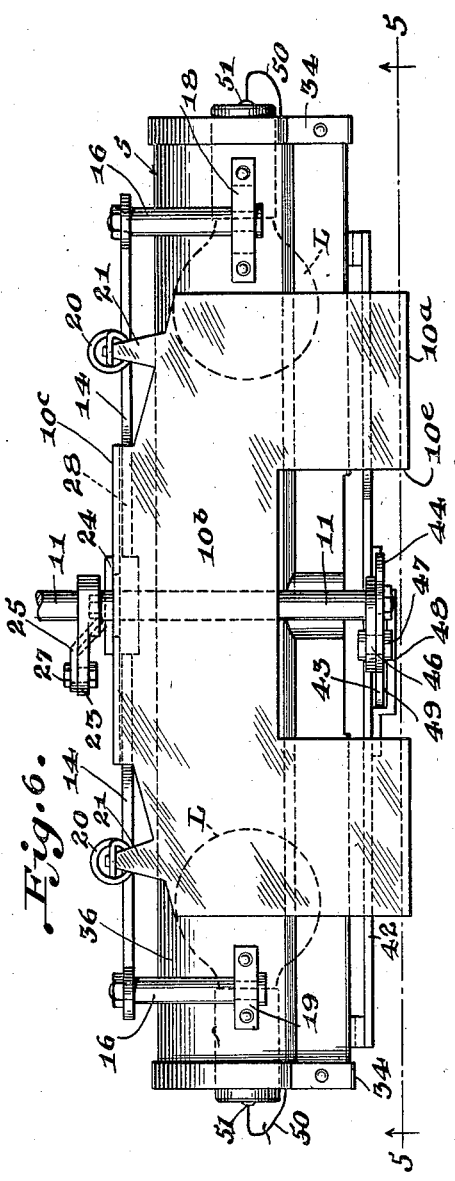
Inventors
L. O. Lucka
J. W. Easley
By Hubert Peck  Attorney Patented Oct. 20, 1931

1,827,851

UNITED STATES PATENT OFFICE

LOUIS O. LUCKA, OF CHAMPAIGN, AND JOHN W. EASLEY, OF DECATUR, ILLINOIS

VEHICLE DIRECTION SIGNAL

Application filed January 30, 1931. Serial No. 512,454.

This invention relates to certain improvements in vehicle direction signals; and the nature and objects of the invention will be readily recognized and understood by those skilled in the art in the light of the following explanation and detailed description of the accompanying drawings illustrating what we at present consider to be the preferred embodiments or mechanical expressions of our invention from among various other forms, embodiments, arrangements, combinations and constructions with which the invention is capable within the spirit and the scope thereof.

Our present invention provides a vehicle direction signal of the general type of that disclosed in our pending U. S. application Serial No. 444,264, in which a signal unit is located and mounted on the interior of a vehicle body adjacent a window or other opening formed through the body, preferably the rear window of the vehicle, and which signal is so mounted that in normal inoperative non-signaling position the signal unit is disposed in position removed and substantially concealed from view from the exterior of the vehicle through such window or opening, while in its operative signal displaying and indicating position the unit is moved and disposed in position facing and visible through the vehicle body window substantially in the normal line of vision of the operator of a following vehicle. Selective actuating mechanism is provided with this type of signal which is operable from the driver's seat, or which may be operatively coupled with the steering mechanism of the vehicle, so that when it is desired to signal to following vehicles the intent to, or the making of, a turn, the signal unit is actuated to move to its operative position visible from the exterior of the vehicle, and to simultaneously display a vision attracting signal indicating the direction in which the vehicle turn is to be made, that is either to the right or to the left.

In accordance with the invention hereof, the signal unit and its actuating mechanism are so arranged that the unit is bodily movable as a unit in a vertical plane to and from operative position visible from the exterior of the vehicle, while mechanism is provided for simultaneously selectively causing the signal unit when moved to operative position to display and give the desired direction indicating visual signal; and it is a general object and feature of my invention to provide a relatively mechanically simple and compact mechanism for efficiently carrying out such operations, together with an arrangement thereof and mounting therefor which enables installation within a vehicle body at the desired location to occupy a minimum of space.

Another object and feature of our invention is to provide a materially simplified operating mechanism under the control of the driver of the vehicle, either for direct manual operation or for operation by and through the vehicle steering mechanism, which signal operating mechanism may be readily installed in the vehicle body to occupy a minimum of space and without interference with normal use of the body, while having the desired characteristics of simplicity of structure and ease of installation.

Another object of the invention is to provide a simple and efficient arrangement by which the signal unit is electrically illuminated so as to distinctly and attractively give its signal when in operative position, and further to provide for automatically illuminating the signal when the signal unit is displayed in operative position and for rendering the illuminating arrangement inoperative when the signal unit moves to its normal substantially concealed and inoperative position.

Another feature and characteristic of the invention resides in the provision of the mechanism for bodily raising and lowering the signal unit from and to operative displayed position, to lock the unit in its operative position until released by the operator either through the manual control or through actuation of the vehicle steering mechanism, and then upon release to cause automatic return of the unit to its inoperative and substantially concealed position.

With the foregoing general objects and features as well as certain other objects, features and results in view which will be readily recognized from the following explanation, the invention consists in certain novel features in construction and in combinations and arrangements of parts and elements as will be more fully referred to and specified hereinafter.

Referring to the accompanying drawings in which similar reference characters refer to corresponding parts throughout the several figures thereof:

Fig. 1 is a view in side elevation of a complete signal and its operating mechanism of the invention in mounted and in installed position within a vehicle body, a portion of the vehicle body with the rear window thereof being shown in vertical section with the signal unit moved to its operative position displayed and visible through the vehicle body rear window by the operating mechanism.

Fig. 1a is a view in elevation of the manual operating handle of the signal actuating mechanism in position such as assumed in Fig. 1 to move the signal unit to operative position and cause the same to display a signal indicating a left turn, the operating handle being shown in its neutral or normal position with the signal unit in inoperative substantially concealed position, by dotted lines.

Fig. 2 is a view similar to Fig. 1 but showing the signal unit and its operating mechanism in position with the unit in its raised normally inoperative and substantially concealed position.

Fig. 2a is a view similar to Fig. 1a but with the operating handle shown in full lines in its position with the signal unit in normal inoperative position, the handle being shown in dotted outline in its position of Fig. 1a.

Fig. 3 is a sectional view taken on the line 3—3 of Fig. 1 through the top of the vehicle and the main operating shaft of the signal, while showing the signal unit and the raising and lowering mechanism therefor in elevation with the signal unit in its lowered displayed and operative position of Fig. 1.

Fig. 4 is a sectional view taken on the line 4—4 of Fig. 2 and similar to Fig. 3 but showing the signal unit and its raising and lowering mechanism in normal raised and inoperative position substantially concealed from view through the rear window of the vehicle.

Fig. 5 is a view in front elevation of the signal unit and the actuating mechanism therefor, including the mechanism for selectively operating the shutters for displaying or concealing the illuminated direction indicating symbol of the unit, the signal unit being in its operative displayed position with the symbol controlling shutters moved to cause the symbol to give the indication of a left turn.

Fig. 6 is a view in top plan of the signal unit and its operating mechanism as shown in Fig. 5, showing the mounting and supporting bracket or frame for the mechanism and the signal unit.

Fig. 7 is a more or less diagrammatic view in elevation of the rear of a vehicle body and the rear window with the signal unit in lowered operative position visible therethrough and giving a direction signal indicating a turn to the left, such as shown by Fig. 5, the normal inoperative and substantially concealed position of the unit being indicated in dotted outline.

In the embodiment and arrangement of a signal and its operating mechanism in accordance with the principles and presenting the several features of our invention, illustrated herewith purely by way of example and not of limitation, a signal unit S is mounted on the interior of a vehicle body B adjacent the rear wall W thereof and above the rear window R for vertical up and down movements to and from its normal inoperative position above and substantially concealed from view from the exterior of the window R, (see Fig. 2) to its operative direction signal displaying position at and visible through this rear window R (see Figs. 1 and 7) from the exterior and to the rear of the vehicle. It is to be clearly understood, however, that while we happen to have selected in our preferred form of the invention the mounting of the signal unit so that in its normal inoperative position it is located above the rear window, the invention is not limited or restricted to such position as the invention contemplates and includes the mounting of the signal unit at other positions within the vehicle or at other points within the vehicle body if desired or found expedient.

In accordance with one possible mechanical expression of the several features of our invention as illustrated in the accompanying drawings, the direction signaling unit S is mounted and supported in position on the interior of the vehicle body for raising and lowering movements bodily as a unit in a vertical plan to and from the operative displayed position shown in Fig. 1 where it is visible through the rear window R from the exterior of the vehicle so as to give the desired selected direction indicating signal. In the particular example hereof the mounting for the unit embodies a mounting bracket and supporting frame 10 which comprises the vertical spaced legs or plates 10a which are attached and secured by any suitable fastening means to and against the rear wall W of the vehicle body centrally above the rear window R thereof, and the horizontally and forwardly disposed top plate or platform 10b terminating at its forward edge in the downwardly depending and vertically disposed plate 10c having the central vertically disposed slot 10d opening through the lower edge and extending upwardly therethrough to and terminating a distance below the top plate 10b. The top plate or platform 10b of the mounting bracket and frame 10 is cut out inwardly a distance between the legs 10a to provide the central opening 10e, as will be clear by reference to Figs. 5 and 6 of the drawings in particular. The mounting bracket and supporting frame 10 carries and has the main operating shaft 11 rotatably journaled in the bearing 12 secured at the under side of the bracket top plate 10b, with the shaft horizontally disposed longitudinally of and below top plate or platform 10b and substantially in a direction fore and aft or longitudinally of the vehicle body B.

The signal unit S is supported from shaft 11 and actuated by such shaft through the medium of interconnecting actuating mechanism so that upon rotation of such shaft the signal unit may be raised and lowered to and from its normal inoperative position of Fig. 2. In the particular example hereof this interconnecting raising and lowering mechanism between unit S and the shaft 11 includes referring particularly to Figs. 3 and 4 of the drawings the arms 14 pivotally and swingably mounted for vertical rocking on the depending plates 10c, respectively, by the pivot pins 15 providing horizontally disposed axes on which arms 14 rock. The arms 14 are disposed in this instance on the inner side of the plates 10c and extend outwardly therefrom and are provided at their outer ends with the inwardly (rearwardly with respect to the vehicle body) extended horizontally disposed and substantially parallel stud shafts 16 which are fixed to the ends of arms 14 and form the medium by which signal unit S is mounted on and supported by the arms 14. The signal unit S includes an enclosing housing or casing 17 and journal boxes or bearings 18 and 19 are suitably secured and fixed on the upper side of the unit casing adjacent the opposite ends thereof and receive the stud shafts 16, respectively, which are journaled therein disposed transversely of the unit S, with such unit supported on shaft 16 in horizontally disposed position. The journal box 18 is provided with elongated bearing 18a which slidably receives its respective stud shaft 15 to permit movement of such shaft longitudinally of casing S. With the foregoing arrangement therefore the signal unit S is suported on and depends from the outer spaced ends of oppositely extending arms 14 in horizontally disposed position therebelow and is bodily raisable and lowerable as a unit by vertically rocking the arms 14 on their pivot pins 15. The journal box 18 permits the necessary play between the stud shaft 16 journaled therein and the unit S to care for the variations in distance between the ends of arms 14 in their raised and lowered positions. When arms 14 are swung downwardly to their positions of Figs. 3 and 5 the signal unit S is lowered thereby to its operative position of Fig. 1, and when these arms are swung upwardly to their raised positions of Fig. 4, the signal unit S is raised to the normal inoperative substantially concealed position of Fig. 2.

The signal unit S through the arms 14 is normally maintained in its raised inoperative position by suitable means such as the coil tension or retractile springs 20 secured at their upper ends to the spaced fingers 21 extending rearwardly from the top plate 10b of bracket 10 adjacent the opposite edges of such top plate, and at their lower ends attached and secured to suitable pins 22 carried by the arms 14, respectively, at points on the arms intermediate the pivot pins 15 and the outer ends of the arms. These springs normally exert a force or tension on the arms 14 to swing the same upwardly and maintain the arms in normal raised position shown in Fig. 4, and to lower the signal unit S arms 14 must be swung downwardly against and to expand the contractile springs 20.

The mechanism for swinging or rocking the arms 14 downwardly against springs 20 to lower the signal unit S, includes in the present example a crank 23 fixed to the main operating shaft 11 between the inner end of this shaft and the depending plates 10c of the bracket 10. A cam block or wedge member 24 is vertically slidably mounted in the slot 10d formed between the depending plates 10c, by opposite edge grooves 24a in this slot (see Fig. 2) into which the opposite edges of slot 10d are slidably received with block 10d confined against lateral displacement. A link 25 is pivotally connected at one end to a pin 26 on the cam block 24 adjacent its lower edge and at its opposite end is pivotally mounted on a pin 27 carried by the crank arm 23 adjacent its outer free end. Thus by rotating the main operating shaft 11 crank arm 23 is rotated and through the links 25 vertically reciprocates the cam block 24 in the slot 10d. The inner end of the opposite arms 14 are provided with the inwardly and upwardly extending heads 28 which terminate in the inwardly extended and curved or rounded cam surfaces 29, which are so arranged as to be engaged and forced apart by the cam block 24 when the latter is raised, so that the arms 14 are swung downwardly to lower signal unit S to its operative position with the block 24 at its limit of upward movement as will be clear by reference to Figs. 3 and 5 of the drawings in particular. When the shaft 11 is rotated to move cam block 24 downwardly in the slot 10d, the cam block moves from between cam surfaces 29 of arms 14 and releases these arms for upward swinging thereof through the action of the contractile springs 20, with the result that these springs perform a retrieving action and automatically swing arms 14 upwardly to raise the signal unit S to its normal inoperative position as shown by Figs. 2 and 4 in particular. On the other hand with the cam block 24 in its lowered position of Fig. 4, upon actuation of shaft 11 in the proper direction, block 24 is raised upwardly between the inwardly extending heads 28 and cam surfaces 29 of the arms 14 so that these heads are forced apart and cause downward swinging of arms 14 against springs 20 to lower the signal unit S to its operative position.

An operating mechanism selectively under the control of the driver of the vehicle, either through direct manual actuation or actuation through and by the steering mechanism of the vehicle, is provided for actuating the main shaft 11 to raise and lower signal unit S from and to its operative signal displaying and direction indicating position visible through the rear window of the vehicle body. In the particular example hereof we happen to show a manually controlled operating mechanism, although it is to be understood that the invention contemplates and includes the operative connection and coupling of such mechanism with the steering mechanism (not shown) of the vehicle for actuation by such mechanism as the same is controlled to turn the vehicle to the right or the left. This manually controlled operating mechanism includes a shaft 30 disposed longitudinally of and along the top of the vehicle, preferably although not necessarily substantially along the longitudinal or fore and aft axes of the vehicle, along and adjacent the top of the vehicle body B, which shaft at its forward end is journaled in a suitable bearing 31 secured to the top of the vehicle and extending rearwardly from such bearing to the forward or inner end of the signal actuating shaft 11 to which it is coupled by means of the universal joint or coupling 32, all as clearly disclosed in Figs. 1 and 2 of the drawings. The shaft 30 extends forwardly or inwardly a distance beyond bearing 31 and is there provided with an operating lever or handle 33 depending therefrom and disposed in such position as to be readily and naturally grasped by the hand of the vehicle driver for lateral swinging to rotate shaft 30. The handle 33 is so mounted in relative position on shaft 30 that with shaft 30 and the signal operating shaft 11 in positions rotated with the signal unit S in its normal raised, inoperative and substantially concealed position, the handle 33 depends from shaft 30 in a substantially vertical position such as shown in full lines by Figs. 2 and 2a and in dotted lines by Figs. 1 and 1a. With this selective manual control or operating mechanism, when handle 33 is swung laterally to either the right or the left from its normal vertically disposed and signal inoperative position, the shaft 30 is rotated to rotate shaft 11 to in turn raise cam block 24 and through the mechanism hereinbefore described cause the lowering of the signal unit S to its operative signal displaying position, where it is locked against displacement until further positive manual actuation of handle 33 back to its normal neutral vertically disposed position.

The signal unit S of the example hereof is formed by a substantially elongated casing or box like structure having closed opposite end walls in the form of flanged caps 34, referring now to Figs. 5 and 6 in particular, fitting over and secured to the opposite ends of the casing and having the substantially flat signal indicating symbol carrying front wall 35 and the opposite side or rear wall 36 outwardly curved to form on the interior of the casing opposite the wall 35, what is in effect a curved light reflector facing such front wall. The front wall 35 is longitudinally cut out to provide the double end direction indicating symbol or arrow shaped opening 37 therethrough, which is covered by a suitable transparent material, preferably red in color such as a sheet or plate of red glass or the like transparent material 38. In this manner a colored double headed arrow is formed in the wall 35 pointing in opposite directions longitudinally of the casing, that is to the right and to the left of the vehicle. A pair of spaced slides or shutters 39 are mounted for reciprocation longitudinally of the front wall 35 on the exterior thereof, in the paths of upper and lower guides 40 disposed along the upper and lower edges of wall 35 adjacent opposite ends thereof, respectively. These slides or shutters 39 mounted in the guides 40 are each formed with a cut away portion 41 in alignment with the arrow shaped opening 37 and the opposite arrow heads thereof, and are so spaced apart and joined by the connecting rod or link 42 for movement in unison longitudinally of the signal unit S, that with one slide at its limit of outward movement the cut away portion thereof exposes the adjacent head of the arrow 37, while the opposite slide or shutter is moved inwardly to a position over and masking the adjacent head of the arrow 37. In this maner the arrow 37 appears as a single headed arrow pointing in the direction of the exposed head, as will be clear by reference to Fig. 5. By reciprocating the slides or shutters 39 in the reverse direction the exposed arrow head is covered up by the adjacent slide 39, while the masked head then becomes exposed through the cut out 41 in the adjacent shutter 39 to form an arrow pointing in the reverse direction.

The invention provides mechanism for actuating the shutters 39 when the signal unit S is lowered to operative position to expose that arrow head which will indicate the direction in which the vehicle is to be turned, in accordance with the lateral direction, in which operating handle 33 is swung, that is, in accordance with whether handle 33 is swung to the right or to the left. This mechanism is actuated by shafts 30 and 11 through the medium of a lever arm 43, still referring to Figs. 5 and 6 of the drawings, which is carried by and depends from the signal actuating shaft 11, at the rear end of such shaft above the shutter connecting link 42. The lever arm 43 is relatively loosely mounted or journaled on the main actuating shaft 11 to permit rotation of such shaft independently of the arm, and this arm at its upper shaft mounted end is formed with an enlarged head portion 44 having an arcuate slot 45 formed therein below and concentric with shaft 11. A crank arm 46 is fixed on shaft 11 adjacent and substantially parallel with lever 43 and is provided at its outer end with the crank pin 47 which extends through and is slidably received in slot 45 of the lever 43. With this arrangement rotation of shaft 11 rocks crank 46 independently of lever arm 43 throughout the length of slot 45, but upon engagement of crank pin 47 with either end of the slot 45, continued rocking of the crank thereupon swings or rocks the lever arm 43 therewith.

The lever arm 43 depends downwardly from shaft 11 to the shutter connecting link 42, which latter is depressed or extends a distance downwardly from and between the shutters 39 so as to give vertical clearance with the signal unit S in its raised position, and on this depressed intermediate portion is provided with a vertical slot forming member or strip 48 suitably secured thereto or formed therefrom to provide the vertically disposed elongated slot 49 (see Fig. 6) into which the lever arm 43 extends and is freely received for movement independently of connecting link 42 in both the vertcial and lateral directions. The relative arrangement and cooperative mounting of lever arm 43 with link 42 and its slot 49 is such that, referring now to Fig. 5 of the drawings, with the signal unit S in its lowered operative position caused by the swinging or rotating of handle 33 to the left, the crank pin 47 engages the adjacent end of slot 45 and swings arm 43 to the left and engages the end of link slot 49 to reciprocate the shutters 39 to the left and thereby expose the left hand arrow head while masking the right hand arrow head. In this manner the desired direction indicating symbol is automatically displayed by the signal unit S simultaneously with the lowering of the unit to operative position, and in accordance with the selective manual swinging of the operating handle 33 to either the right or the left by the driver, in accordance with his intention to turn his vehicle to either the right or the left. With the signal in its lowered position of Fig. 5 and arm 43 swung to the left, to give a signal indicating a turn to the right the operating handle 33 is swung downwardly through its neutral or normal position and then over to the right which raises and then again lowers unit S and at the same time swings arm 43 to the opposite side of slot 49 of connecting link 48, after crank pin 47 has swung through to the opposite end of slot 45 and thereupon reciprocates the shutter 39 to expose the right hand arrow head while masking the left hand one.

In order to illuminate the direction indicating arrow 37 and thereby more distinctly and clearly give the desired signal indication under all conditions of operation, electrical lamps L are mounted and installed in the end caps 34 of the signal unit casing and disposed in position within the casing substantially opposite the arrow heads of the double headed arrow 37, as will be clear by reference to Figs. 5 and 6 of the drawings. These lamps L are mounted with their bases removably secured in the end caps 34, respectively, and an arrangement is provided by which the circuits to the lamps are broken with the signal unit in its raised inoperative position and are automatically closed to illuminate the lamps with the unit in its lowered operative and signaling displaying position. In the particular example hereof and more or less diagrammatically shown in Figs. 1, 2, and 5 of the drawings, one possible arrangement for carrying out this feature of the invention is disclosed and includes an electric battery or other source of electric current P, one terminal of which is connected by the wire or other suitable conductor 50 with the center terminals 51 of the bases of the lamps L and the other terminal of this battery P is connected by wire 52 to ground G, the other terminals of the bases of the lamps L are electrically connected with the end caps 34, which are preferably of metal, of the signal unit casing and this casing is electrically connected through wire 53, switch 54 and wire 55 to ground G. With the signal unit S in its lowered operative position of Fig. 1 and Fig. 5 the switch 54 is closed and the circuit is completed from battery P to the lamps L, which lamps are thereby illuminated. When the signal unit S is raised to its elevated, inoperative and substantially concealed position, of Fig. 2, the switch 54 is opened, as diagrammatically illustrated by Fig. 2 to break the circuit and darken the lamps L. In this way the lamps L are automatically illuminated by the movement of the signal unit S to its lowered operative position and cut off or rendered inoperative when the unit is raised by springs 20 to its inoperative position.

In use on a vehicle, in its raised position with the operating handle 33 in the vertically disposed neutral position, the signal unit S is substantially concealed from the view of following drivers and substantially unobstructing the rearward view through the vehicle rear window by occupants of the vehicle. When the driver for example proposes to turn to the left he grasps handle 33 and throws the same to the left into the position of Figs. 1 and 1a. This results in rotating shafts 30 and 11 and raising cam block 24 to force arms 14 apart and lower the signal against springs 20 to its operative position visible through the rear window R and displaying the desired signal, the lamps L being illuminated as previously explained when the unit assumes its lowered position. Simultaneous with the lowering of the signal unit the arm 43 is swung to reciprocate the shutters 39 to the left to thereby expose the left hand arrow head while masking the right hand head to thereby produce a visual signal in the form of an arrow pointing to the left, as will be clear by reference to Figs. 1 and 5. After the driver has made his indicated left turn the lever 33 is grasped and swung to its vertically disposed neutral position which lowers cam block 24 and permits the springs 20 to retract and raise the signal unit to its normal inoperative and substantially concealed position, the shutter connecting link 42 riding upwardly on and over the depending shutter operating arm 43 as clearly shown by Fig. 2 of the drawings. Simultaneously with the elevated or raising of the signal unit, the switch 54 is broken and the lamps L are darkened or cut off. If the driver then proposes to make a turn to the right, he merely swings handle 33 to the right, whereupon simultaneously the signal unit S is lowered against springs 20 and the shutters 39 are reciprocated by lever 43 to the right so as to expose the right hand arrow head while masking the left hand one to cause the signal to display an arrow pointing to the right.

The direction indicating signal and its operating mechanism are simple and efficient in operation; are capable of installation within a vehicle at a point with which they will not interfere with normal use of the vehicle and operate to give a clear distinct direction indicating signal at a point on the vehicle such that the signal lies within the normal range of vision of a driver of a following car, although it is not desired to limit the invention in all respects to this exact location. The signal unit and its operating mechanism can be readily mounted and installed in a vehicle and when once installed will occupy a minimum space and call for a minimum of maintenance in operation and use to clearly and distinctly give the desired signals. Attention is also directed to the fact that while a hand operating lever 33 is disclosed for selective actuation by the driver, the invention includes the operative coupling of the shaft 30 with the steering mechanism of a vehicle so as to actuate the signal upon turning operation of such steering mechanism.

It is also evident that various changes, modifications, substitutions, eliminations, additions and variations might be resorted to without departing from the spirit and the scope of our invention and hence we do not wish to limit ourselves in all respects to the exact and specific disclosures hereof.

What we claim, is:

1. The combination with a vehicle and the body thereof having a window therein, of a vehicle direction indicating signal embodying a signal unit, direction indicating signals therein, said unit in normal position disposed substantially concealed from view through said window from the exterior of the vehicle, and said signal unit bodily movable in a vertical plane through a substantially straight path to and from visual position through said window for operation in visual position to display a direction indicating signal.

2. The combination with a vehicle body, of a vehicle direction indicating signal unit direction indicating signals therein, said unit movable bodily in a substantially straight path from normal position substantially concealed from view from the exterior of the vehicle, to position visual from the exterior of said vehicle, to display a direction indicating signal, and from visual position back to normal position, and mechanism operable by the driver of the vehicle for moving said unit to and from signal displaying position.

3. The combination with a vehicle body, of a vehicle direction indicating signal unit, said unit bodily vertically movable in a straight path to and from normal position substantially concealed from view from the exterior of the vehicle, to operative signal displaying position visible from the exterior of the vehicle, manually controlled means operable from a remote point for moving said unit to and from visual position to display direction indicating signals, and the said unit including selectively operable visual signal displaying mechanism actuated to display the desired direction indicating signal by and simultaneously with the operation of said manually controlled means to move said unit to operative position.

4. The combination with a vehicle body, of a vehicle direction indicating signal unit bodily movable as a unit vertically to and from normal position substantially concealed from view from the exterior of the vehicle, to signal displaying position visible from the exterior of the vehicle, manually controlled means for moving said signal unit to and from normal concealed position and display position, said signal unit including a casing having visual direction indicating signals thereon, and mechanism for selectively displaying said signals when said unit is in signal displaying position visible from the exterior of the vehicle, said selective signal displaying mechanism operatively coupled with and actuated by said manually controlled means for actuation to simultaneously display a signal with the movement of the signal unit to position visible from the exterior of the vehicle.

5. In a vehicle direction indicating signal, in combination, an operating shaft, a signal unit for displaying direction indicating signals disposed therein, said unit disposed substantially transversely of said shaft, and mechanism operatively coupling said unit with such shaft for operation by rotation of the shaft to move said unit bodily toward and away from the shaft, from and to operative signal displaying position.

6. In a vehicle direction indicating signal, in combination, a rotatably mounted operating shaft, a signal displaying unit direction indicating signals disposed therein, said unit mounted substantially transversely of said shaft for bodily movement toward and from the shaft, and mechanism operatively coupling said unit with the shaft and actuated by rotation of the shaft to move the unit away from the shaft to signal displaying position, and toward the shaft to normal non-display position.

7. In a vehicle direction indicating signal, in combination, a horizontally disposed rotatably mounted operating shaft, a signal displaying unit direction indicating signals disposed therein, said unit disposed substantially transversely of such shaft for vertical movement toward and from the shaft, and mechanism operatively coupling said unit with the shaft and actuated by rotation of the shaft to move the unit away from the shaft to operative signal displaying position and to move the same toward the shaft to normal non-display position.

8. In combination with a vehicle body having a rear window therein and including the body top, an operating shaft rotatably mounted within the body longitudinally thereof along the top, an operating handle member for rotating said shaft, a direction indicating signal unit horizontally disposed below said shaft adjacent the body rear window, said unit mounted for vertical movement to and from normal raised position adjacent said shaft above and substantially concealed from view through the rear window from the exterior of the vehicle, to lowered signal displaying position visible through the rear window, and mechanism operatively coupling said unit with the shaft for actuation to raise and lower the unit by rotation of said operating shaft.

9. In a vehicle direction indicating signal, in combination, an operating shaft, a direction signal displaying unit disposed adjacent the shaft for movement toward and from the shaft, to and from inoperative, non-display position, said unit including selective direction signal displaying mechanism, means operatively coupling the unit with the shaft for movement to and from non-display position, to operative display position, by rotation of the shaft in either direction, and means operatively coupling the shaft with the selective signal displaying mechanism for simultaneous actuation thereof with rotation of the shaft to move the unit to display position, to selectively display a direction indicating signal in accordance with the direction of rotation of the operating shaft.

10. In a vehicle direction indicating signal, in combination, a supporting bracket member, an operating shaft rotatably mounted in horizontally disposed position on said bracket, vertically swingable oppositely extended arms mounted on said bracket, spring means normally maintaining said arms in upwardly swung position, a signal displaying unit pivotally mounted on and depending from and between the outer ends of said arms, and mechanism actuated by said operating shaft for swinging said arms downwardly against said spring means to lower the signal unit to operative signal displaying position, and for releasing said arms for upward swinging under the action of said spring means to raise the signal unit to normal non-display position.

11. In a vehicle direction indicating signal, a supporting bracket structure, vertically swingable oppositively extended arms pivotally mounted on said bracket structure and formed with inwardly extended inner end heads, springs normally maintaining said arms in upwardly swung elevated positions with the inner end heads thereof in proximity, a signal unit pivotally mounted on and depending from and between the outer ends of said arms for raising and lowering thereby, a vertically reciprocable cam member for upward movement between the inner end heads of said arms to force said heads apart to swing the arms downwardly against said springs and lower the signal unit to operative position, said cam member when moved downwardly releasing said arms for upward swinging by said springs to raise the signal unit to elevated and normal non-display position, and means for vertically reciprocating said cam member.

12. In a vehicle direction indicating signal, in combination, a signal unit vertically bodily movable as a unit to and from elevated non-display position to lowered operative signal display position, said unit including direction indicating symbols at one side thereof, and movable shutters for selectively displaying the desired signal, means for raising and lowering said signal unit, and mechanism operatively coupled between said raising and lowering means and said shutters for moving the latter to display the desired signal simultaneously with the lowering of the signal unit to operative display position.

13. In a vehicle direction indicating signal, in combination, a horizontally disposed operating shaft, a signal unit disposed below said shaft and vertically movable toward and from the same to and from raised non-display position, to lowered display position, means operatively coupling said shaft with the display unit for raising and lowering the unit by rotation of said shaft, said unit including direction indicating symbols and reciprocating shutter means for selectively displaying a desired direction indicating symbol, an arm depending from an operable by said shaft for swinging thereby, and said arm operatively engaging said shutter means when swung by said shaft to reciprocate the shutter means to display the desired symbol in acordance with the direction of rotation of said shaft simultaneously with the lowering of the signal unit to display position.

14. In combination with a vehicle body having a rear window therein, a signal unit mounted within the body adjacent said rear window and vertically bodily movable to and from normal non-display position substantially concealed from view through the window from the exterior of the vehicle, to operative display position visible through the window, a horizontally disposed operating shaft rotatably mounted above the signal unit, mechanism operatively coupling said shaft with the unit to raise and lower the unit by rotation of the shaft in either direction, an extension shaft operatively connected with said operating shaft and extending forwardly through the vehicle body, and a manual operating lever at the forward end of and for rotating said extension shaft to rotate the operating shaft and raise and lower said signal unit.

15. In a vehicle direction indicating signal, in combination, a rotatably mounted operating shaft, a direction signal displaying unit disposed transversely of such shaft for movement toward the same to normal non-display position not visible from the exterior of the vehicle, and from the same to operative display position visible from the exterior of the vehicle, yielding means normally withdrawing and maintaining the unit to non-display position, and mechanism operatively coupling said unit with the shaft for actuation upon rotation of the shaft to move the unit to visible position from the exterior of the vehicle against said yielding means for display of direction indicating signals, and to release the unit for withdrawal thereof by said yielding means from display to non-display position.

Signed at Champaign, Champaign County, Illinois, this 19th day of December, 1930.

LOUIS O. LUCKA.

Signed at Decatur, Macon County, Illinois, this 19th day of December, 1930.

JOHN W. EASLEY.